Figure 1:
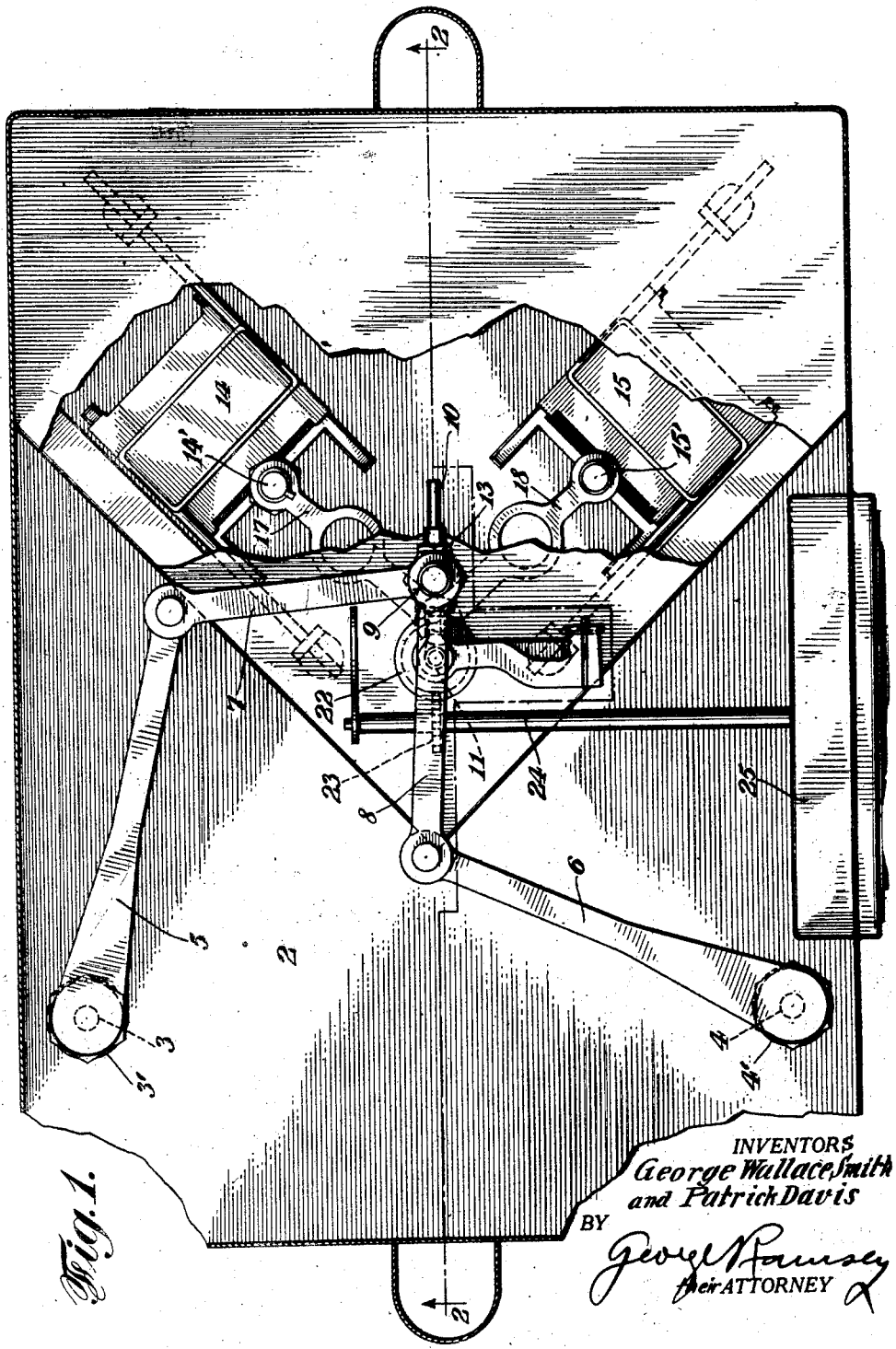

Aug. 24, 1926.

G. W. SMITH ET AL 1,597,211

GAS METER

Filed March 10, 1924

2 Sheets-Sheet 1

INVENTORS
George Wallace Smith
and Patrick Davis
BY
George N Ramsey
their ATTORNEY

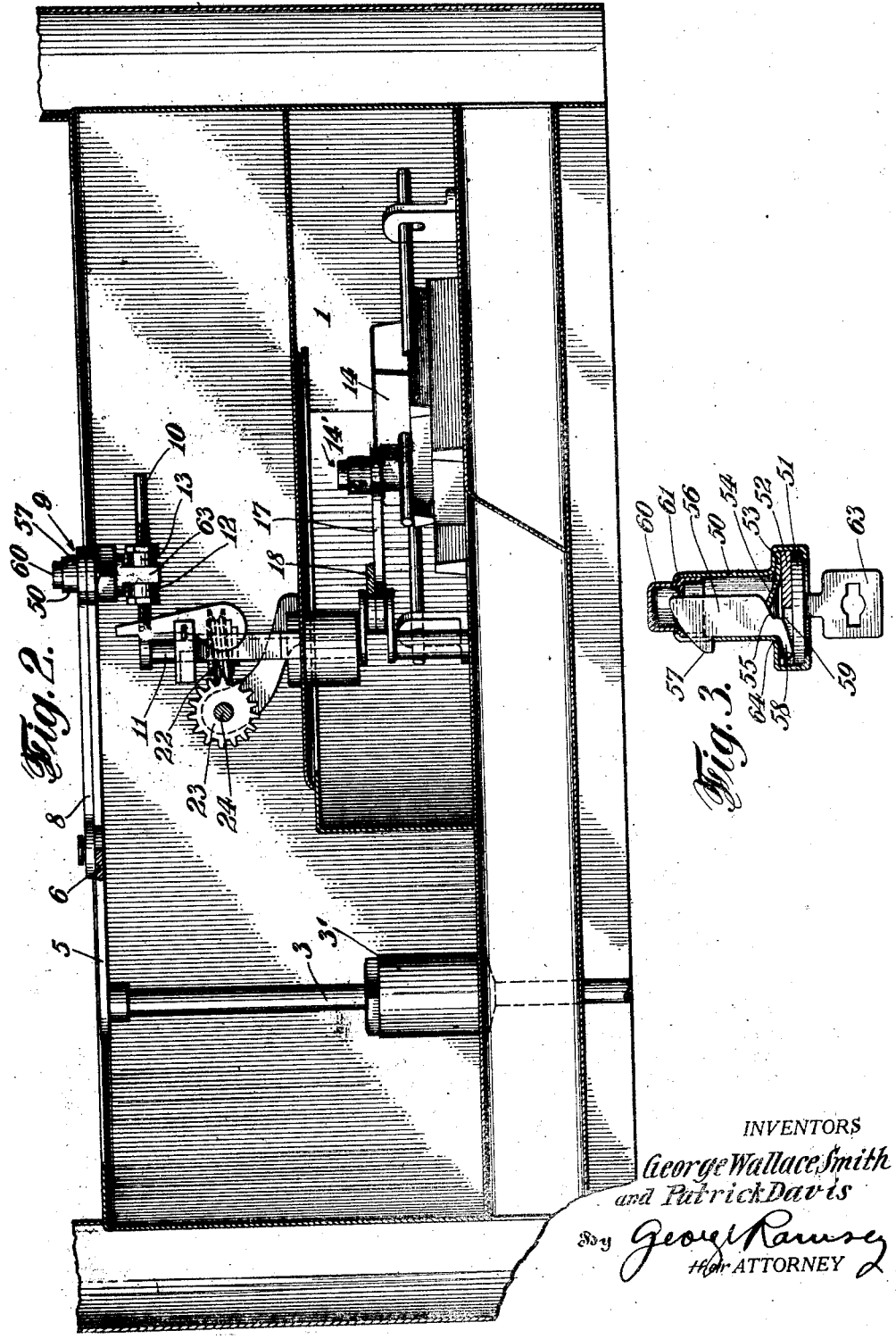

Patented Aug. 24, 1926.

1,597,211

UNITED STATES PATENT OFFICE.

GEORGE WALLACE SMITH AND PATRICK DAVIS, OF SAN ANTONIO, TEXAS.

GAS METER.

Application filed March 10, 1924. Serial No. 698,007.

This invention relates to gas meters and the like and particularly to means for preventing the accidental derangement of the operative members of such devices.

An object of the invention is to provide driving connections for measuring and recording devices in which pivotal parts which may be disconnected during adjusting or testing, are automatically locked in place upon being restored to operative position, thus avoiding the danger of subsequent accidental derangement.

Another object of the invention is to provide a fluid meter having means whereby the operative parts may be readily placed in pivotal relation and in which the parts are automatically locked in such relation.

Another object of the invention is to provide a fluid meter in which operative parts are pivoted together through the instrumentality of a stud, and automatically operated means are associated with the stud to prevent accidental discontinuance of the pivotal relation of the parts.

A further object of the invention is to provide a gas meter in which pivotal elements that may be easily disconnected during adjusting or testing are secured together by means of a stud carried by one member and an aperture in another member, the stud being provided with a spring pressed catch which automatically operates upon insertion of the stud through the aperture, to prevent accidental rupture of the pivotal relation between the members.

A still further object of the invention is to provide a measuring and recording device in which operative elements are pivoted through the instrumentality of a stud, and a spring pressed barb is so associated with the stud that it does not interfere with assembling the parts in pivotal relation but is automatically operative to prevent accidental discontinuance of the pivotal relation.

A well known type of gas meter is constructed with an upper and lower section, the lower section comprising two compartments each containing bellows means or the equivalent which are displaced by the gas to be measured; and the upper section comprising a main chamber and a valve chamber. Mechanically associated with the two bellows members or equivalent volume measuring means, is a pair of vertical shafts which are oscillated upon movement of the bellows members and which are connected by means of link members to a crank shaft to effect its rotation in response to the movement of the bellows members. By means of connecting links motion from the crank shaft is communicated to a pair of slide valves to control the flow of gas to the volume measuring devices.

During the adjustment and testing of a meter of the foregoing type, it frequently becomes necessary to disturb the pivoted relation between the crank shaft and the links which communicate motion to it from the pair of vertical shafts; and to disturb the pivotal relation between the two connecting links and the slide valves. Upon completion of test or adjustment, it not infrequently happens that the tester or repairman neglects to insert cotter pins which are ordinarily used to prevent accidental rupture of the pivotal relation at the three points just mentioned, in which case it is quite probable that during subsequent handling or transportation of the meter the pivotal relation at these points will be destroyed.

In case the pivotal connection between the links associated with the pair of vertical shafts and the crank shaft is broken it will be impossible for movement to be transmitted to the valves in response to displacement of the piston members or other volume measuring device employed, and hence it will be impossible for the meter to pass gas. This condition will not be apparent until after the meter has been installed and an attempt is made to clear the line of air and test for leaks. Since it is the usual practice for meters to be sealed upon the completion of testing at the repair shop the installer will be unable to correct the difficulty, and hence it will be necessary to remove the meter and return it to the shop.

In case the pivotal relation between a connecting link and a valve is destroyed, the valve will become displaced, thus allowing gas to pass directly from the inlet to the outlet without passing through the volume measuring means, and hence the meter will not record the amount of gas which passes. This will cause a negative result in test for leaks in the house piping since the meter will not indicate the passage of gas. Usually there will be no indication of trouble with the meter until the next date when the meter is read and it indicates no consumption of gas. This not only results in a loss to the supplier for the gas consumed but necessitates the expense of replacing the meter and repairing the one previously installed.

The present invention overcomes the difficulties of the known prior art by providing a meter in which the pivotal relation between parts that may be disconnected during adjusting or testing is effected through the instrumentality of a hollow stud carried by one member and cooperating with the aperture of another member. Projecting from the hollow stud near its free end is a spring pressed barb like member positioned so as not to interfere with the insertion of the stud through the aperture of an operating member, but which automatically prevents disconnection of the members unless the barb is intentionally withdrawn into the hollow stud. On the free end of the stud there is provided a push button which upon actuation cooperates with the barb to withdraw the barb into the stud and permit disconnection of the pivoted members. By means of this construction the members become automatically locked in pivotal relation as soon as such relation is established, and hence it is impossible for the pivotal relation to be subsequently destroyed accidentally through failure to install cotter pins or equivalent retaining means. However, should it be desired to disconnect the pivoted elements the locking means is quickly made inoperative by pressing the push button.

Referring to the drawings which show the invention applied to a well known type of gas meter, Figure 1 is a plan view showing the upper section of a gas meter and having a portion of the valve chamber wall cut away to disclose the valves;

Figure 2 is a vertical sectional view taken on line 2—2 of Fig. 1, showing the upper section of the meter shown in Figure 1; and Figure 3 is a detailed sectional view showing the construction of the tangent bat of the meter, which comprises a pivoting stud and locking means in accordance with the present invention.

The upper section of the gas meter comprises a valve chamber 1 and a main chamber 2 into which project vertical shafts 3 and 4 through stuffing glands 3' and 4'. Rigidly affixed to shafts 3 and 4 are arms 5 and 6 coupled with links 7 and 8 respectively. Each of which are pivoted to element 9 known as a "tangent bat." The tangent bat is mounted on arm 10 eccentric of crank shaft 11, the degree of eccentricity being variable by adjustment of the nuts 12 and 13. Slide valves 14 and 15 of well known construction are connected by means of connecting links 17 and 18 to the crank shaft 11. The oscillatory movement of the shafts 3 and 4 is transmitted to the crank shaft 11 in the form of rotary motion which results in reciprocation of the valves 14 and 15 to control the flow of gas. A worm 22 carried by crank shaft 11 meshes with worm gear 23 thus transmitting rotary motion to shaft 24 of revolution counter 25 which is calibrated to record the amount of gas passed in terms of volumetric units.

Referring to Figure 3 which shows the tangent bat 9 detached from the rest of the apparatus, a hollow stud 50 is enlarged at its lower end and spun or pressed around the edges of base member 51, slotted member 52 and spring member 53. Spring member 53 is formed from a flat piece of spring metal and has an upstruck prong 54 engaging the surface 55 of a barb carrying element 56 as shown. The nose or barb 57 projects as shown through a slot in the upper end of the hollow stud 50 and the lower end of element 56 is provided with a toe 58 which is laterally supported by the walls of the slot 59 in the member 52. The spring prong 54 tends to rotate the barb carrying member 56 in a counter-clockwise direction, thus normally retaining it in the position shown. Slidably positioned in the upper end of the hollow stud 50 is a push button 60 shaped as shown and retained in place by means of the inspun or crimped edge 61 of the stud 50 which overlies the enlarged portion of the push button. The tangent bat 9 is mounted in place upon arm 10 by means of the apertured members 63 which is positioned between nuts 12 and 13 (Figure 2) and which may be made integral with base 51 or suitably secured thereto as by brazing or welding.

It is apparent from the arrangement of the barb carrying member 56 within the hollow stud 50 that a lever having a thickness equal to or less than the distance between the nose or barb 57 and the point 64 on the stud and having an aperture of proper size, may be readily positioned on the stud to pivot it to the member carrying the stud. Due to the barb like shape of the nose 57 the member 56 will readily rotate in a clockwise direction and allow the lever to be placed in position; and as soon as it is positioned spring prong 54 will turn the barb to the position shown in the drawing, thus automatically locking the lever in place. Should it be desired to remove the lever this can readily be done by pressing the button 60 which through the engagement of the upper end of the slot in the wall of the button with the slopping portion of the nose 57 will rotate the barb carrying member 56 in a clockwise direction thus withdrawing the barb 57 within the stud permitting the removal of the lever.

The valve wrists 14' and 15' by means of which pivotal relation is established between the valves 14 and 15 and the connecting links 17 and 18 are constructed similarly to the tangent bat 9 excepting that member 53 is absent and the base plate 51 is integral with or suitably secured to the body of the valve as by welding or brazing.

It is apparent from the foregoing disclosure that applicant has provided a fluid meter or the like in which there are automatically operated means to retain pivotal relations which may be established during adjusting and testing and hence there will be no difficulty due to accidental termination of such relations through failure of the workman to install cotter pins or like retaining devices.

We realize that the present invention may be embodied in constructions other than that disclosed and hence we desire that the present disclosure be considered as illustrative and not in the limiting sense.

Having thus described our invention what we claim is:

1. A fluid meter comprising; a link; a movable member; a stud pivoting said link to said member; and means automatically operative upon positioning said link in pivotal relation to said member, to prevent accidental termination of the pivotal relation.

2. A fluid meter comprising; a link; a movable member; a stud pivoting said link to said member; and a spring pressed latch carried by one of said members and operative upon positioning said link in pivotal relation to said member, to prevent accidental termination of the pivotal relation.

3. A fluid meter comprising; a member; a stud affixed to said member; an apertured lever adapted to be pivoted to said member with said stud passing through said aperture; and automatically operative means associated with said stud to prevent accidental withdrawal of said stud from said aperture.

4. A fluid meter comprising, the combination of a valve mechanism, means for operating said valve mechanism to permit the flow of gas through said meter, a plurality of links connecting said valve operating means to said valve mechanism, and means associated with said valve mechanism for fastening certain of said links in operating position, said means being automatically operative to fasten said links when said links are placed in operating position.

5. A gas meter comprising a tangent arm, a pivot stud mounted on said arm, a pair of driving links pivoted to said stud, and a spring pressed latch associated with said stud and operative to retain said driving links in pivotal relationship with said stud, said latch being inoperative to interfere with establishment of the pivotal relationship and automatically operative upon establishment of the pivotal relationship to prevent accidental displacement of the driving links.

GEORGE WALLACE SMITH.
PATRICK DAVIS.